(12) United States Patent
Hussain et al.

(10) Patent No.: US 8,728,325 B2
(45) Date of Patent: May 20, 2014

(54) ADVANCED OXIDATION OF KINETIC HYDRATE INHIBITORS

(75) Inventors: Altaf Hussain, Doha (QA); Isik Riza Turkmen, Dona (QA); Joel Minier Matar, Dona (QA); Samir Gharfeh, Doha (QA); Samer Adham, Doha (QA)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 13/409,553

(22) Filed: Mar. 1, 2012

(65) Prior Publication Data

US 2012/0241387 A1    Sep. 27, 2012

Related U.S. Application Data

(60) Provisional application No. 61/466,686, filed on Mar. 23, 2011.

(51) Int. Cl.
| | |
|---|---|
| *B01D 21/00* | (2006.01) |
| *C02F 1/52* | (2006.01) |
| *C02F 1/78* | (2006.01) |
| *C02F 1/72* | (2006.01) |
| *C02F 1/68* | (2006.01) |
| *C04B 33/04* | (2006.01) |
| *C09K 8/52* | (2006.01) |
| *E21B 43/28* | (2006.01) |
| *C02F 101/30* | (2006.01) |
| *C02F 103/10* | (2006.01) |

(52) U.S. Cl.
CPC .............. *C02F 1/725* (2013.01); *C02F 1/722* (2013.01); *C02F 1/5236* (2013.01); *C02F 1/727* (2013.01); *C02F 1/78* (2013.01); *C02F 2305/026* (2013.01); *C02F 2101/30* (2013.01); *C02F 2103/10* (2013.01); *C09K 8/52* (2013.01); *C09K 2208/22* (2013.01)
USPC .......... 210/721; 210/722; 210/749; 210/758; 210/759; 210/760; 210/763; 507/90

(58) Field of Classification Search
None
See application file for complete search history.

(56) References Cited

U.S. PATENT DOCUMENTS

| | | | |
|---|---|---|---|
| 5,868,945 A * | 2/1999 | Morrow et al. | ............... 210/760 |
| 6,646,082 B2 | 11/2003 | Ghosh et al. | |
| 7,435,845 B2 | 10/2008 | Dahlmann et al. | |
| 7,615,102 B2 * | 11/2009 | Leinweber et al. | ............. 95/153 |
| 2003/0063998 A1 | 4/2003 | Ghosh et al. | |
| 2008/0312478 A1 | 12/2008 | Talley et al. | |

OTHER PUBLICATIONS

Dincer, et al. "Removal of COD From Oil Recovery Industry Wastewater by the Advanced Oxidation Processes (AOP) Based on H2O2", Global NEST Journal, 2008, 10, 31-38, Global NEST.*
Dincer, et al. "Removal of COD from Oil Recovery Industry Wastewater by the Advanced Oxidation Processes (AOP) Based on H2O2", Global NEST Journal, 2008, 10, 31-38.*

(Continued)

*Primary Examiner* — Nam Nguyen
*Assistant Examiner* — Clare Perrin
(74) *Attorney, Agent, or Firm* — ConocoPhillips Company

(57) ABSTRACT

Advanced oxidation process namely ozonation and Fenton's (hydrogen peroxide/Fe:$^{2+}$) were utilized to degrade kinetic hydrate inhibitor (KHI). The oxidized solution after scavenging oxygen can be successfully disposed to the injection well. This facilitates use of KHI more frequently and in higher concentrations for future projects oil & gas operations. It also offers an alternative that competes efficiently with thermodynamic hydrate inhibitor (THI) or complements THI.

21 Claims, 10 Drawing Sheets

(56) References Cited

OTHER PUBLICATIONS

Konrad Stemmier, Urs von Gunten, "OH Radical-Initiated Oxidation of Organic Compounds in Atmospheric Water Phases: Part 1. Reactions of Peroxyl Radicals Derived from 2-Butoxyethanol in Water," Atmospheric Environment, vol. 34, Issue 25, Jul. 26, 2000, pp. 4241-4252.

Konrad Stemmier, Urs von Gunten, "OH Radical-Initiated Oxidation of Organic Compounds in Atmospheric Water Phases: Part 2. Reactions of Peroxyl Radicals With Transition Metals," Atmospheric Environment, vol. 34, Issue 25, 26 Jul. 2000, pp. 4253-4264.

Marc M. Huber, Anke Gobel, Adriano Joss, Nadine Hermann, Dirk Loffler, Christa S. Mcardell, Achim Ried, Hansruedi Siegrist, Thomas A. Ternes and Urs von Gunten, "Oxidation of Pharmaceuticals During Ozonation Municipal Wastewater Effluents: A Pilot Study," Environment Science Technology, 2005, vol. 39, No. 11, pp. 4290-4299.

Luca Del Villano, Roald Kommedal, and Malcolm A. Kelland, "Class of Kinetic Hydrate Inhibitors with Good Biodegradability," Energy and Fuels 2008, vol. 22, pp. 3143-3149.

Form PCT/ISA/210 International Search Report dated Jul. 5, 2012, 4 pgs.

Jan P. Eubeler et al., Environmental Biodegradation of Synthetic Polymers I. Test Methodologies and Procedures, Trends in Analytical Chemistry, vol. 28, No. 9, pp. 1057-1072, Oct. 1, 2009.

Fakhru'l-Razi Ahmadun et al, Review of Technologies for Oil and Gas Produced Water Treatment, Journal of Hazardous Materials, vol. 170, No. 2-3 (2009), pp. 530-551.

Konrad Stemmier, Urs von Gunten, "OH Radical-Initiated Oxidation of Organic Compounds in Atmospheric Water Phases: Part 1. Reactions of Peroxyl Radicals Derived from 2-Butoxyethanol in Water," Atmospheric Environment, vol. 34, Issue 25, Jul. 26, 2000, pp. 4241-4252

Konrad Stemmier, Urs von Gunten, "OH Radical-Initiated Oxidation of Organic Compounds in Atmospheric Water Phases: Part 2. Reactions of Peroxyl Radicals With Transition Metals," Atmospheric Environment, vol. 34, Issue 25, Jul. 26, 2000, pp. 4253-4264

Marc M. Huber, Anke Gobel, Adriano Joss, Nadine Hermann, Dirk Loffler, Christa S. Mcardell, Achim Ried, Hansruedi Siegrist, Thomas A. Ternes and Urs von Gunten, "Oxidation of Pharmaceuticals During Ozonation Municipal Wastewater Effluents: A Pilot Study," Environment Science Technology, 2005, vol. 39, No. 11, pp. 4290-4299

K. Thomas Klasson, Costas Tsouris, Sandie A. Jones, Michele D. Dinsmore, Angela B. Walker, David W. DePaoli, Sotira Yiacoumi, Viriya Vithayaveroj, Robert M. Counce and Sharon M. Robinson, "Ozone Treatment of Soluble Organics in Produced Water," Petroleum Environmental Research Forum Project 98-04, pp. 1-85.

Jessica Benner and Thomas A. Ternes, "Ozonation of Propranolol: Formation of Oxidation Products," Environment Science Technology, 2009, vol. 43, No. 13, pp. 5083-5093.

Susan J. Masten and Simon H.R. Davies, "The Use of Ozonation to Degrade Organic Contaminants in Wastewaters," Advances in Water Treatment Technologies, Environment Science Technology, vol. 28, No. 4, 1994, pp. 180A-185A.

Purushottam V. Shanghag, Asim K Guha and Kamalesh K. Sirkar, "Membrane-Based Ozonation of Organic Compounds," I&EC Research, Membrane-Based Ozonation of Organic Compounds—Industrial & Engineering Chemistry Research, pp. 1-12.

Luca Del Villano, Rald Kommedal, and Malcolm A. Kelland, "Class of Kinetic Hydrate Inhibitors with Good Biodegradability," Energy and Fuels 2008, vol. 22, pp. 3143-3149.

Luca Del Villano, Roald Kommeda, Martin W.M., Fijten, Ulrich S. Schubert, Richard Hoogenboom and Malcolm A. Kelland, A Study of Kinetic Hydrate Inhibitor Performance and Seawater Biodegradability of a Series of Poly (2-alkyl-2-oxazoline)s, Energy Fuels, 2009, vol. 23, pp. 3665-3673.

"Oxidation of Polyvinylpyrrolidone and an Ethoxyate Surfactant in Phase Inversion Waste Water," Water Environment Research (Water Environ Res), vol. 4, 2008, pp. 373-379.

Spartan Environmental Technologies, "Ozone Generator, Electrolytic and Other Advanced Oxidation Process and Disinfection Applications from Spartan," pp. 1-2.

\* cited by examiner

FIG. 2
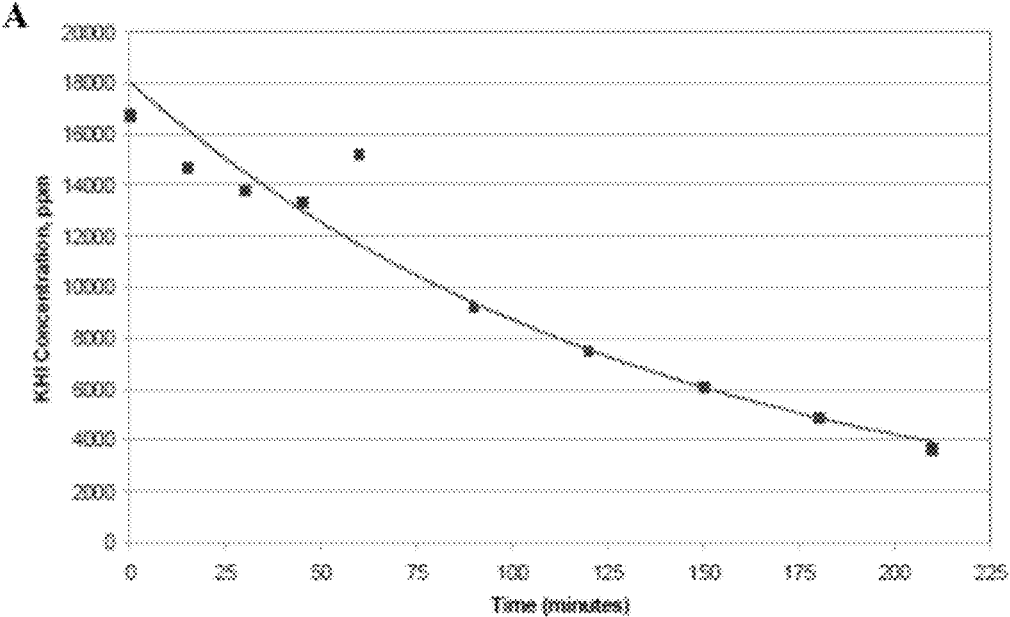
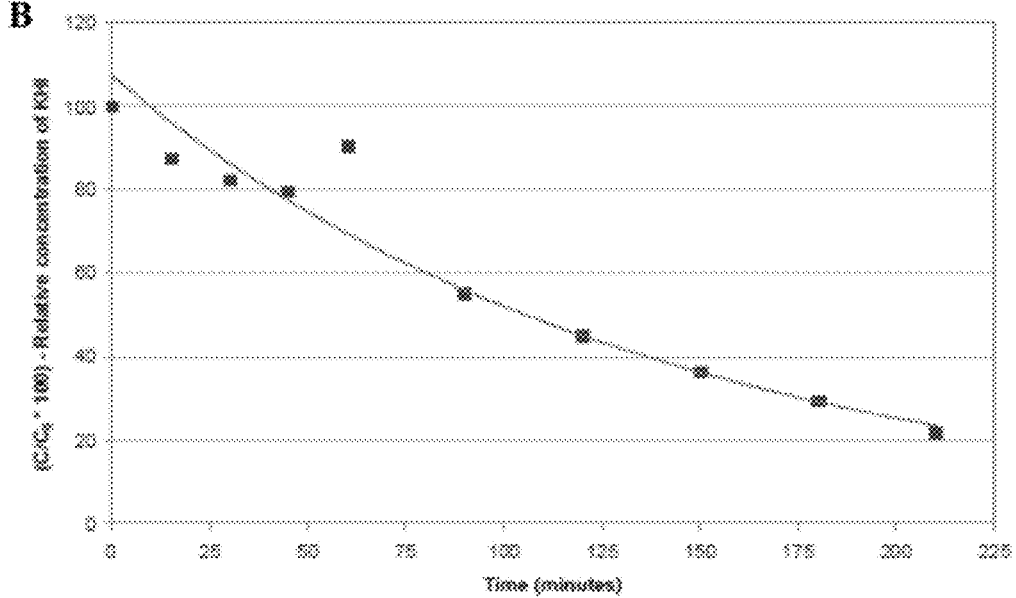

FIG. 10
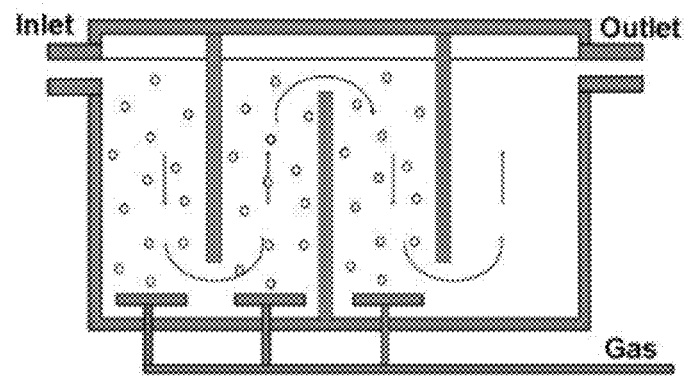
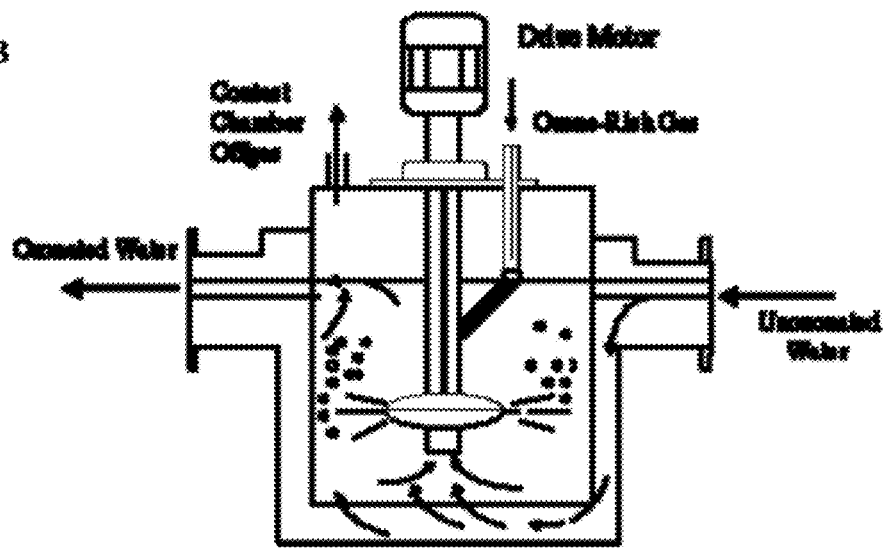
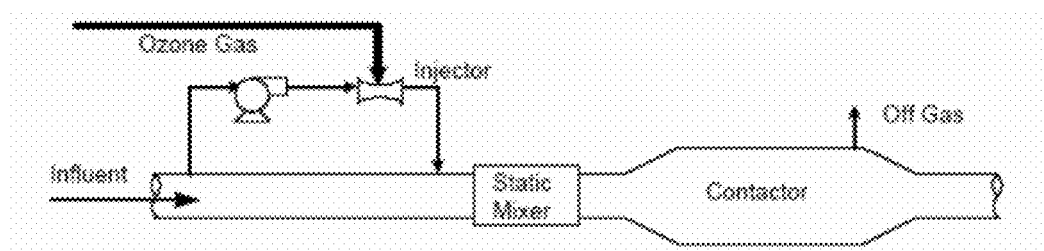

ADVANCED OXIDATION OF KINETIC HYDRATE INHIBITORS

CROSS-REFERENCE TO RELATED APPLICATIONS

This application is a non-provisional application which claims benefit under 35 USC §119(e) to U.S. Provisional Application Ser. No. 61/466,686 filed Mar. 23, 2011, entitled "ADVANCED OXIDATION OF KINETIC HYDRATE INHIBITORS," which is incorporated herein in its entirety.

STATEMENT REGARDING FEDERALLY SPONSORED RESEARCH

None.

FIELD OF THE INVENTION

This invention relates to a process of treating process water, produced water and industrial waste water to remove contaminants including kinetic hydrate inhibitors (KHI).

BACKGROUND OF THE INVENTION

Treatment of water and disposal during the production of oil and gas can play a major role in the viability and cost of oil and gas projects. In many locations water is expensive or difficult to obtain. Water may have to be transported to the site or purchased in order to complete a project. Water used during the project is frequently reused as much as possible, and after production the water must be disposed of. In order to recycle or disposal of wastewater, contaminants in the water must be degraded, processed, and/or removed to ensure that the clean environment is not harmed and chemicals are not released.

Hydrates are crystalline solids that can be formed in a fluid whether the fluid is flowing or stationary. Hydrates form crystalline ice-like solids when water under the certain pressures and temperatures in the presence of low molecular weight hydrocarbon gases including methane, ethane, propane, butanes, pentanes, hexanes, $H_2S$, $CO_2$, and other small gases. Although hydrates are most problematic in fluids that are conveyed through pipe, they may form solid under a variety of conditions and block the surface of the pipe, which can lead to catastrophe. Hydrates can also be abrasive and deteriorate the pipe wall. Changes in pressure and temperature may cause hydrates to expand releasing explosive gases and increasing pressures to dangerous levels. There is a need, therefore, for improved and cost effective methods for inhibiting hydrate formation without permanently contaminating water produced or used during the production and transportation of hydrocarbons, including natural gas, crude oil, bitumen, tar sands, and other hydrocarbon sources.

There are two broad techniques to control hydrate formation in hydrocarbons, namely thermodynamic and kinetic inhibitors. Thermodynamic inhibitors include water removal, increasing temperature, decreasing pressure, addition of "antifreeze" to the fluid and combinations of these methods. The kinetic approach generally prevents/delays the smaller hydrocarbon hydrate crystals from agglomerating into larger ones (known in the industry as an anti-agglomerate and abbreviated AA), they also may inhibit, retard and prevent initial hydrocarbon hydrate crystal nucleation or crystal growth (known in the industry as a kinetic hydrate inhibitor and abbreviated KHI). Additionally, films that protect the inside of the pipelines, tubing, valves and such prevent both hydrate crystallization and corrosion of the materials. Thermodynamic inhibitors, kinetic hydrate inhibitors and anti-agglomerate were used to reduce or prevent hydrate formation.

In U.S. Pat. No. 6,646,082 and US2003063998, Ghosh, used oligomeric and polymeric compositions as fluid additives in aqueous systems which are effective corrosion inhibitors over a wide range of pH and render metals passive to repeated attack by oxidants and oxidizing biocides. Dahlman, U.S. Pat. No. 7,435,845, and Leinweber, U.S. Pat. No. 7,615,102, replace hazardous thermodynamic hydrate inhibitors with corrosion inhibitors and gas hydrate inhibitors having improved film persistence and good biodegradability. Talley and Colle, US20080312478, discovered the synergistic effects of the thermodynamic hydrate inhibitors and kinetic hydrate inhibitors are additive and therefore, significantly reduce hydrate formation in a fluid.

Ozonation has been shown to effectively remove surfactants, biological contaminants, and other materials from wastewater for municipal and commercial production services (Klasson et al, 2002). Suzuki and associates (1976 a&b) found *P. aeruginosa* PEG-K utilized ethylene glycol, diethylene glycol, and triethylene glycol produced by ozone degradation of high molecular PEG followed by treatment with $H_2O_2$. Narkis and associates (Narkis and Schneider-Rotel, 1980; Narkis and Schneider-Rotel, 1985; Narkis, et al. 1987) improved biodegradability of non-ionic surfactants caused by ozonation through changes in molecular structure. Delanghe, et al., (1991) reviewed the aqueous ozonation reactions of surfactants including the degree of reaction and ozonation byproduct identity. Homg, et al., (1998) investigated surfactant wastewater treatment by electro-chemical oxidation with or without hydrogen peroxide. Da Pozzo, et al., (2005) described electro-Fenton treatment of a solution containing phosphorus compounds using graphite electrodes. Urbans, (2006) describes the use of peroxide as a water treatment method. Agladze, et al., (2007) optimized cell design and current efficiencies for cathodic reduction of oxygen at gas-diffusion electrodes in membrane cells. Peralta-Hernández, et al., (2009) summarize and analyze the results of electro-Fenton (EF) and photoelectro-Fenton (PEF) methods. Petrucci, et al., (2009) presented enhancement of electro-Fenton treatment, performed by employing a PTFE-bonded gas diffusion cathode. Rosales, et al., (2009) describes the use of the electro-Fenton process to clean soil or clay contaminated by organic compounds. Brillas provides an overview of current oxidation technologies (Oturan and Brillas, 2009; Brillas, 2009; Oturan, et al., 2009). Unfortunately, waste water produced from natural gas, SAGD, LNG, and other hydrocarbon processes contains contaminants not present in other commercial processes. Additionally, KHI materials are becoming more complex, KHI concentrations are increasing, and there is a greater volume of produced water, so systems used to process KHI containing water must work more rapidly on a larger scale than previously available. Processes that involve heating, incineration or other attempts simply produce more waste, use more equipment, or are too expensive to be implemented at the variety of hydrocarbon processing locations around the world under a variety of different environmental conditions.

An efficient KHI removal process is required not only to remove KHI in production and transportations systems today, but that will allow production from more extreme areas, such as deep water and arctic reservoirs where increased pressures and lower temperatures will contribute to hydrate formation. Improved KHI removal will allow higher concentrations of KHI to be used in these more extreme environments. Additionally, KHIs may be used in systems with other more complex contaminants. An efficient and inexpensive method of KHI removal must be developed to remove kinetic hydrate inhibitors from wastewater and process water that allows the water to be either re-injected into the subterranean formation or further processed without producing solid wastes and/or generating toxic by-products that are difficult to dispose of or damaging to the environment.

BRIEF SUMMARY OF THE DISCLOSURE

A robust oxidation system is desired that degrades significant amounts of KHI at lower temperatures, because oxidations reactions improve with increasing temperatures, produced water with KHI will be readily oxidized at higher temperatures if the reaction functions well at low temperatures. Processing the KHI containing solutions at produced water temperature without heating or cooling, reduces the cost of processing, decreases the amount of equipment required, and provides a smaller footprint within the limited confines of the production area.

The invention more particularly includes a process for treating kinetic hydrate inhibitor contaminated solutions by mixing one or more kinetic hydrate inhibitor (KHI) containing aqueous solutions with a KHI degrading oxygen containing molecule, including Fenton's Process (adding hydrogen peroxide then adding iron (Fe2+)) and/or bubbling with ozone; separating precipitates from the KHI degraded solution; and obtaining clean water.

In another embodiment, a process for treating KHI contaminated solutions is described where one or more KHI containing aqueous solutions is mixed with Fenton's solution (adding hydrogen peroxide then adding iron (Fe2+)), separating precipitates from the KHI degraded solution; and obtaining clean water.

Additionally, a process for treating KHI contaminated solutions is described where one or more KHI containing aqueous solutions is bubbled with ozone; and clean water is obtained.

The processes may be conducted in a tank, sediment pond, or other water storage container. The process may use one or more columns in a continuous process. The process may include ozonation and Fenton's process simultaneously. The process may include ozonation followed by Fenton's process. The process may include Fenton's process followed by ozonation.

One or more KHIs may include vinyl caprolactam, ester amides, polyester pyroglutamate, N-acylalkylene imines, 2-alkyl-2-oxazolines, PMeOx, PEtOx, PnPrOx, PiBuOx, PnBuOx, N-vinyl-N-methyl acetamide, vinylpyrrolidone, PVP, tetrabutylammonium bromide, PDMAEMA, homopolymers, copolymers, linear, branched, highly branched monomers, polymers and mixed polymers thereof. Oxygenated KHIs may include a highly branched methoxylate, ethoxylate, propoxylate, butoxylate, pentoxylate, hexoxylate, carboxylate, ester, or other oxygenated KHI.

BRIEF DESCRIPTION OF THE DRAWINGS

A more complete understanding of the present invention and benefits thereof may be acquired by referring to the follow description taken in conjunction with the accompanying drawings in which:

FIG. 1: Ozone Bubble column system.

FIG. 2: Degradation of KHI in field Brine: FIG. 2A demonstrates KHI oxidation of field brine by ozone as function of time. FIG. 2B demonstrates relative KHI concentration of field brine by ozonation as function of time.

FIG. 3B demonstrates relative KHI concentration of synthetic brine by ozonation as function of time.

FIG. 6A demonstrates KHI oxidation in synthetic brine by ozone at pH 3.5 and pH 9.0. FIG. 6B demonstrates relative KHI concentration during the ozonation at pH 3.5 and pH 9.0.

FIG. 10: Ozone contactors including (A) a baffled chamber diffuser, (B) a turbine diffuser contactor, and (C) a side stream ozone system.

DETAILED DESCRIPTION

Figure 1A:
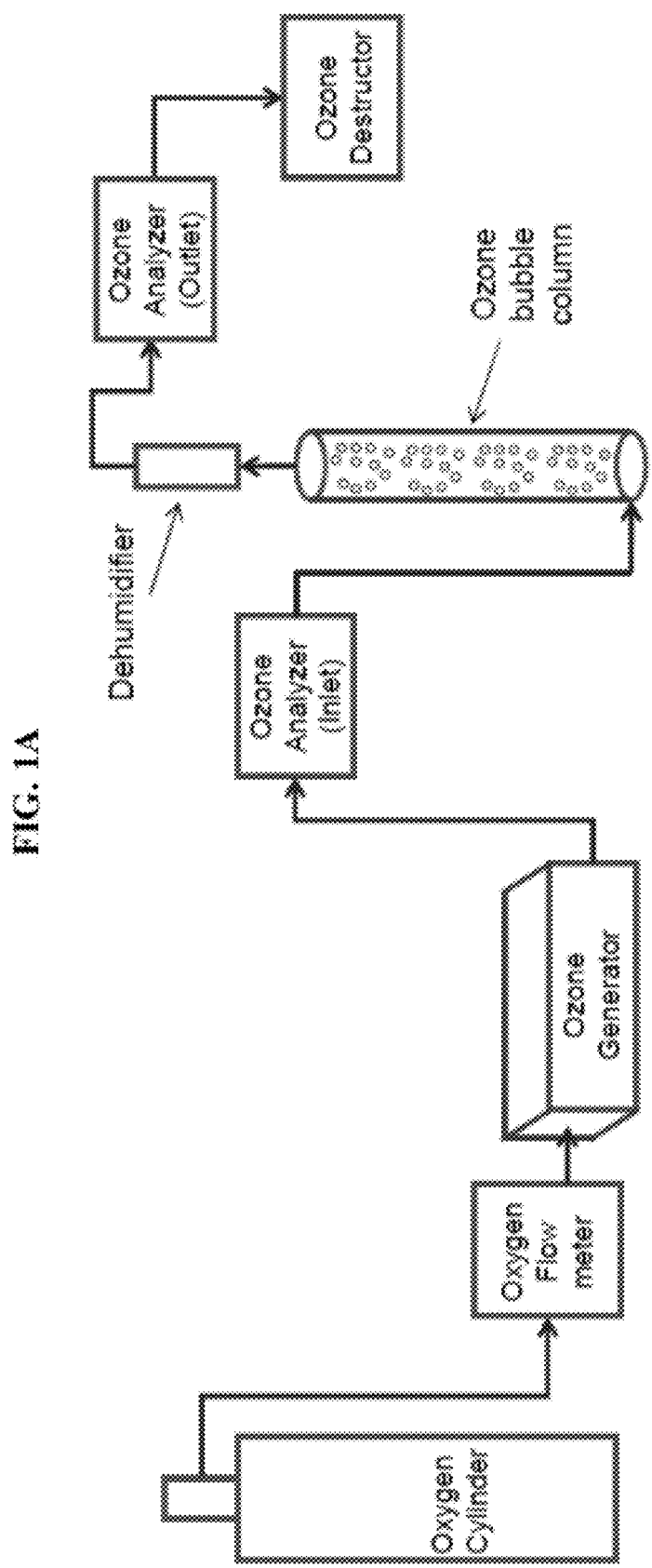
FIG. 1A is a diagram of an ozone bubble column for KHI removal.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Abbreviations include: kinetic hydrate inhibitor (KHI); thermal hydrate inhibitor (THI); low dosage hydrate inhibitor (LDHI); normal liters per minute (Nit/min); grams per normal cubic meter ($g/Nm^3$); parts per million (ppm); monoethylene glycol (MEG), diethylene glycol (DEG), triethylene glycol (TEG), poly(2-methyl-2-oxazoline) (PMeOx); poly (2-ethyl-2-oxazoline) (PEtOx); poly(2-n-propyl-2-oxazoline) (PnPrOx); poly(2-isobutyl-2-oxazoline) (PiBuOx); poly(2-n-butyl-2-oxazoline) (PnBuOx); poly-N-vinylcaprolactam (PVCap); polydimethylaminoethylmethacrylate (PDMAEMA); poly vinylpyrrolidone (PVP); high pressure liquid chromatography (HPLC); advanced oxidation processes (AOPs), and wet humid oxidation process (OHP®).

As used herein, hydrocarbons may include natural gas, petroleum, crude oil, bitumen, tarsands, pitch, and other hydrocarbon containing materials as well as processed hydrocarbon materials including methane, ethane, butane, LNG, syngas, gasoline, fuel oil, diesel, kerosene, and the like. Hydrocarbons being recovered, processed and transported may have KHIs added to prevent hydrate formation.

Hydrates, as used herein, refers to ice-like structures in which water molecules, under pressure, form structures composed of polyhedral cages surrounding "guest" molecules including salts, methane, ethane or other molecules.

Kinetic hydrate inhibitors (KHIs) include, but are not limited to: vinyl caprolactam, ester amides, polyester pyroglutamate, N-acylalkylene imines, 2-alkyl-2-oxazolines including PMeOx, PEtOx, PnPrOx, PiBuOx, PnBuOx and the like; N-vinyl-N-methyl acetamide; vinylpyrrolidone; PVP; tetrabutylammonium bromide; PDMAEMA; as well as homopolymers, copolymers, and mixed polymers thereof, including linear, branched and highly branched monomers and polymers. Proprietary KHIs are available from NALCO®, and include FREEFLOW® LDHI, among others.

Thermodynamic inhibitors (THIs) include methanol, ethanol, glycol, ethylene glycol, MEG, DEG, TEG, salts, NaCl, $CaCl_2$, KCl, and the like.

sulfate $(SO_4)$, bicarbonate $(CO_3)$. Brines from a variety of locations, including various production wells and ocean water are shown in Table 2. Brine solution composition will vary greatly dependent upon the reservoir being produced and the treatment being applied to the reservoir, additionally conditions will vary over time.

TABLE 2

A variety of Brine Solutions

| ION | Well 1 | Well 2 | Well 3 | Well 4 | Well 5 | Prudhoe Bay | North Sea | BRINE "A" | BRINE "E" |
|---|---|---|---|---|---|---|---|---|---|
| Sodium | 7805 | 29370 | 56723 | 28100 | 52225 | 8000 | 11010 | 72000 | 81600 |
| Potassium | 200 | 372 | 1525 | 1630 | 3507 | 83 | 460 | 6300 | 8000 |
| Magnesium | 25 | 504 | 1250 | 113 | 2249 | 84 | 1368 | 4000 | 2500 |
| Calcium | 70 | 2808 | 16075 | 615 | 34675 | 180 | 428 | 48000 | 20000 |
| Strontium | 20 | 574 | 938 | 65 | 1157 | 24 | 8 | 1000 | 2000 |
| Barium | 70 | 252 | 23 | 770 | 91 | 4 | <1 | 1200 | 3700 |
| Iron | <1 | <1 | 60 | <1 | 107 | — | <1 | — | — |
| Chloride | 11500 | 52360 | 121600 | 46050 | 153025 | 11500 | 19700 | 21000 | 174000 |
| Sulfate | 0 | 11 | 220 | 4 | 44 | 10 | 2960 | 0 | 0 |
| Bicarbonate | 1650 | 496 | 100-300 | 1655 | 134 | 2222 | 124 | — | — |
| Total Dissolved Solids | 21350 | 86747 | 198614 | 79003 | 247214 | 22107 | 36058 | N/A | N/A |
| Ionic Strength | 0.359 | 1.58 | 3.90 | 1.35 | 5.28 | | 0.712 | | |

Oxidants for KHI degradation include ozone, Fenton process, OHP® process, $ClO_2$, peroxide, and other oxidants weak or strong depending upon the application and concentration of KHI to be removed. Oxidants may be used individually, in series, or during the same oxidation reaction if applicable. Ozone and chlorine dioxide have the highest oxidation potential as shown in Table 1. Ozone and chlorine dioxide produce hydroxyl radicals, whereas Fenton process requires Fe ion to react with hydrogen peroxide at pH 3-5 to produce hydroxyl radicals. Other oxidizers are available that may be adapted to one or more processes. Selection of oxidizing agent will depend upon the kinetic inhibitors used and the concentration of the kinetic inhibitors. Additionally, oxidation can be improved in the presence of electrolysis, sonic cavitation, or other processes. In one example the OzoNix® system which uses cavitation to increase solution temperature during cavitation using electrolysis and sonic cavitation.

TABLE 1

Oxidation Potential

| Oxidizing agent | Oxidation potential |
|---|---|
| Fluoride | 3.06 V |
| Hydroxyl radical $OH^-$ | 2.80 V |
| Atomic Oxygen | 2.42 V |
| Ozone | 2.07 V |
| Hydrogen peroxide | 1.77 V |
| Permagnate Ion | 1.67 V |
| Chlorine di oxide | 1.50 V |
| Chlorine | 1.36 V |

Brine solution may be any aqueous solution with a mixture of salts, including inorganic salts such as carbonates and sulfates of various metals, i.e. calcium, strontium and barium as well as complex salts of iron such as sulfides, hydrous oxides and carbonates. Although salt compositions may vary, some typical ions dissolved in brine include sodium (Na), potassium (K), magnesium (Mg), calcium (Ca), strontium (Sr), barium (Ba), iron (Fe), chloride (Cl), bromide (Br), As used herein a diffuser is used to ensure contact time between the KHI in solution and the ozone or other gases applied to the solution. Diffusers may include baffled chamber diffusers, turbine diffusers, side stream ozone contactor, and other diffusers some of which are shown in FIG. 10. In one embodiment, baffled chamber diffusers are designed to degrade KHI at a rate sufficient to remove all of the KHI even at or above capacity. The number of chambers, the geometry, the diffuser systems, and operation may be adjusted to degrade KHI at an appropriate rate. In one example, the ozone contactor has several compartments in series with bubble diffusers at the bottom. In the first compartment the water flows downward against the rising bubbles, and in the second compartment the water flows upward. The chambers are covered to prevent the escape of ozone and to increase the partial pressure of the ozone in the contactor. Additional chambers follow to guarantee a contact time between the ozone and the water. Each of the chambers has sampling ports so that the ozone concentration in each chamber can be determined. This is needed to calculate the product of concentration and retention time required to ensure contact time value.

In one embodiment, a synthetic brine was prepared by dissolving 1.68 g NaCl, 5.475 g $CaCl_2.2H_2O$, 3.120 g $MgCl_2.5H_2O$, 19.5 ml of 0.1 M KCl, 0.111 g $Na_2SO_4$, 0.135 g $NH_4Cl$, 0.1125 g $SrCl_2.6H_2O$ and 1.2 g $NaC_2H_3O_2$ (Sodium Acetate) per 1.5 liters total of aqueous solution. The solution was adjusted to pH 9.0. In another embodiment, commercial brine from ADMA-OPCO is available with the following ionic concentrations: 3,300 mg/L $Cl^-$, 350 mg/ml acetate, 50 mg/L $SO_4^{-2}$, 10 mg/L $Br^-$, 600 mg/L $Na^+$, 50 mg/L $K^+$, 250 mg/L $Mg^{+2}$, 1000 mg/L $Ca^{+2}$, 30 mg/L $NH_4^+$, and 25 mg/L $Sr^{+2}$. Although this example uses multiple salts in various concentrations, brine solutions may contain only one type of salt, i.e. a sodium chloride brine or potassium sulfate brine for example. In another embodiment, the brine concentration varies as the water is produced and may be adjusted to achieve a specific ionic strength by adding de-ionized water, fresh water, or purified water to reduce ionic strength; or by adding recycled water, salts, or other additives to increase ionic strength. The pH may also be monitored as it will fluctuate during production and may be adjusted by adding buffer, acid or base as appropriate.

Normal conditions are 0° C. and 1 atm pressure unless otherwise stated. The temperature may change during production and processing and may vary depending upon the type of production, the location of the water and the stage of water production. Waste water produced during transportation, i.e. to and from the wellhead or platform may be at 0-4° C. Water produced to and from various LNG processes may be at or below 0° C. and may even go down to about −40° C. or lower dependent upon the pressures and salt concentrations, while water produced during distillation processes may be at or near boiling. Similarly, wastewater from a SAGD production may be at or near boiling while wastewater produced from offshore marine platforms may be at or near 0° C. Pressure may also vary and is completely dependent upon the conditions under which the water is produced, although the wastewater or production water can be brought to atmospheric pressure for processing.

Figure 1B:
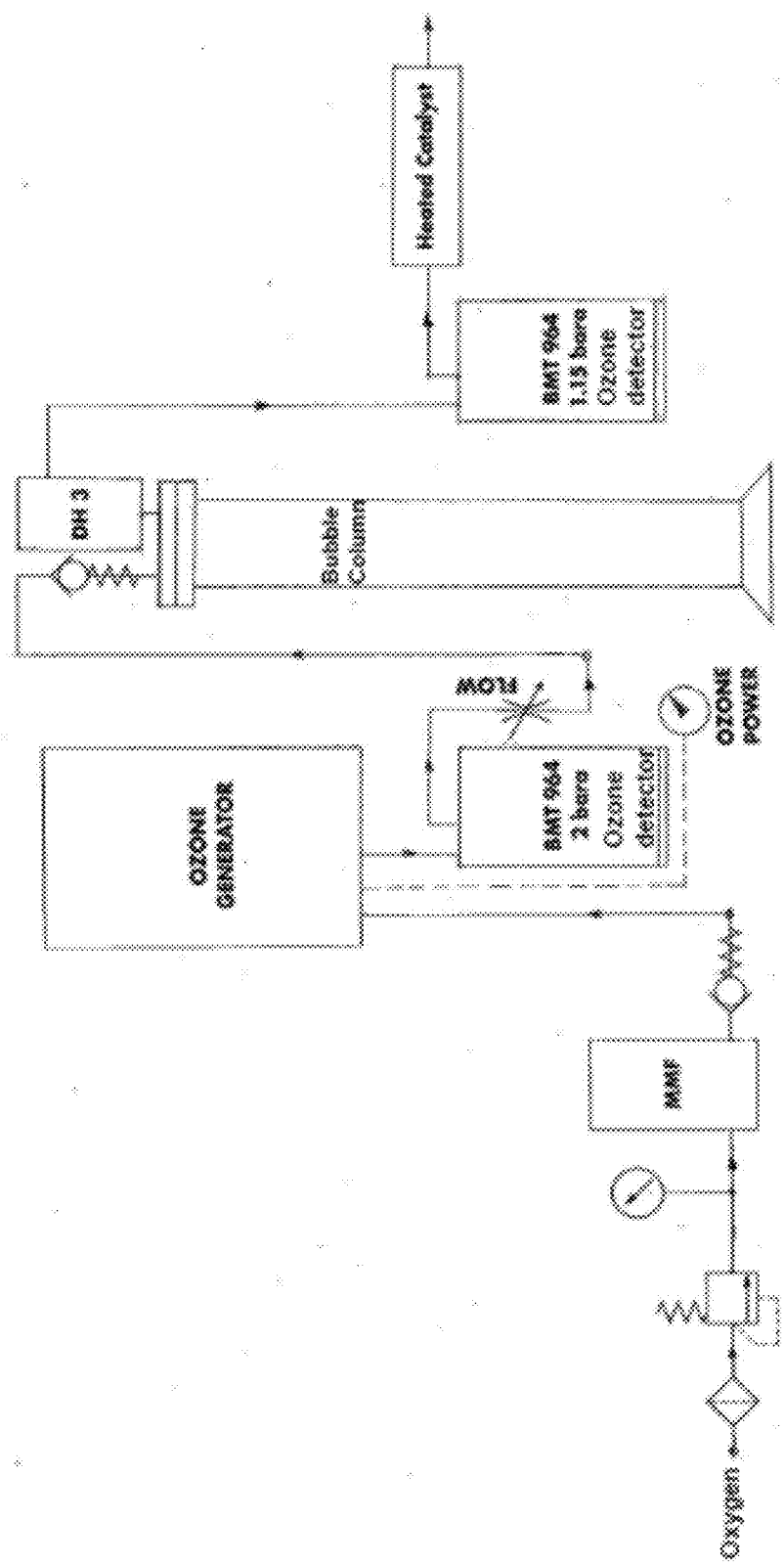
FIG. 1B is the schematics of the ozone bubble column showing the ozone generator, feed ozone detector, bubble column, dehumidifier, off gas ozone detector and heated catalyst.

Ozonation equipment demonstrated in FIG. 1A and as show in detail in FIG. 1B, includes an oxygen source, an oxygen flow meter (i.e. an MMF oxygen flow meter), an ozone generator (i.e. a BMT ozone generator), an inlet ozone detector (i.e. a BMT 964 2bara ozone detector), a bubble column, a dehumidifier, an outlet ozone detector (i.e. a BMT 964 2bara ozone detector), and a heated catalyst to break down any excess ozone and other by-products.

A variety of oxygen flow meters are available from a variety of commercial sources. The MMF flow meter described above is available from DWYER® Instruments, Dakota Mass, PVL, Fox Instruments, and many other commercial suppliers. The oxygen flow meter may measure oxygen content, temperature, flow rate, and other parameters depending upon the model and rate of oxygen flow.

The ozone generator is selected to produce above a minimum level of ozone required per hour and ozone generation is monitored using an ozone detector that can measure at a minimum ozone concentration. Numerous ozone generators and detectors are available from BMT Messtechnik GmbH, Berlin, Germany. Ozone generators are also commercially available from Ozone Generator USA, O3OZONE Generators, DEL® Ozone Generators, PROZONE® Commercial Systems, and other commercial sources. Ozone detectors are available from BMT, ChemLogic, IN USA, Inc., as well as other ozone analyzers including various UV/Vis systems. Numerous chemistry suppliers can provide commercial or custom made column bubblers including those available from PYREX®, CHEMGLASS®, VWR Labshop, NOVATECH® International, and other suppliers. A bubble column may also be assembled from one or more columns, including mixing columns with filters at the base and/or along the length of the column. In one embodiment a supply tube is placed below a borosilicate frit at the base of a 1 liter column, ozone is bubbled through the frit into the treated solution. A frit at the top of the column prevents foaming solution from escaping the top of the column and entering the gas outlet to the dehumidifier.

Mixing may be achieved by bubbling, with paddles or mixers, by pumping, or by aeration with ozone, air, or other gas. The reaction processes described herein may be conducted in a column, mixing column, reactor, tank, mixing tank, storage tank, storage pond, or other means of storage used in the industry for water, wastewater or production water. Where applicable, reactions may be carried out in batch, semi-batch processes, or continuous operations depending upon the amount of aqueous solution, concentration of hydrate inhibitor, and strength of oxidant used. Mixing may be achieved in one or more column and columns may be assembled in series with multiple ozonation columns each with a unique concentration of ozone.

The following examples of certain embodiments of the invention are given. Each example is provided by way of explanation of the invention, one of many embodiments of the invention, and the following examples should not be read to limit, or define, the scope of the invention.

Example 1

Ozonation

Figure 5:
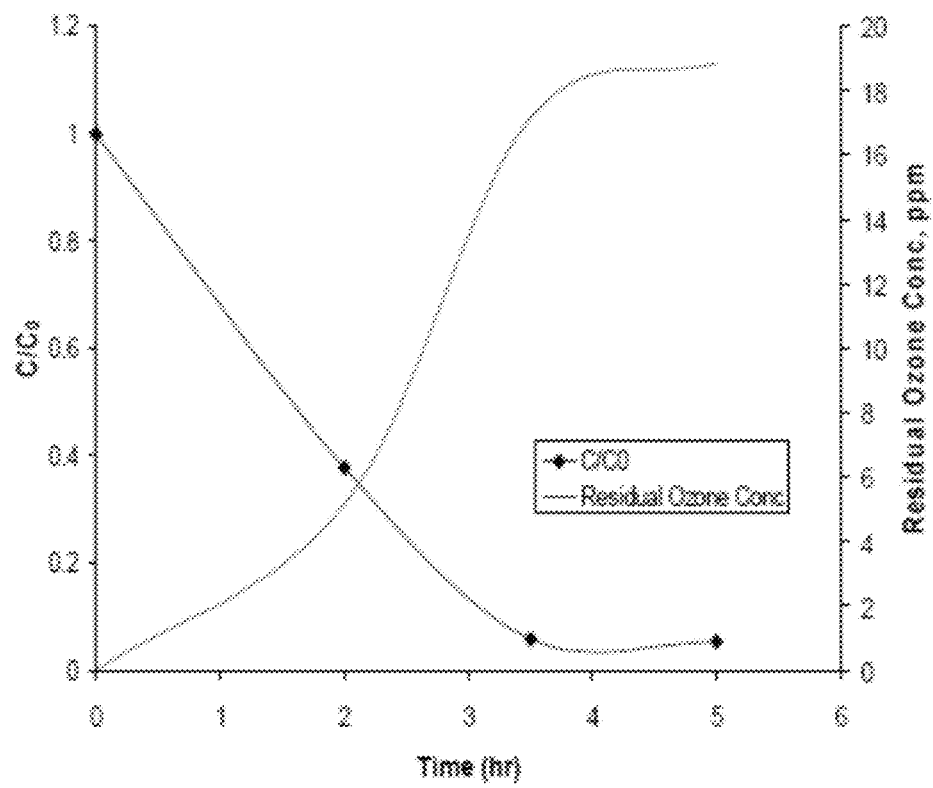
FIG. 5: Ozone degradation of KHI.
Figure 6:
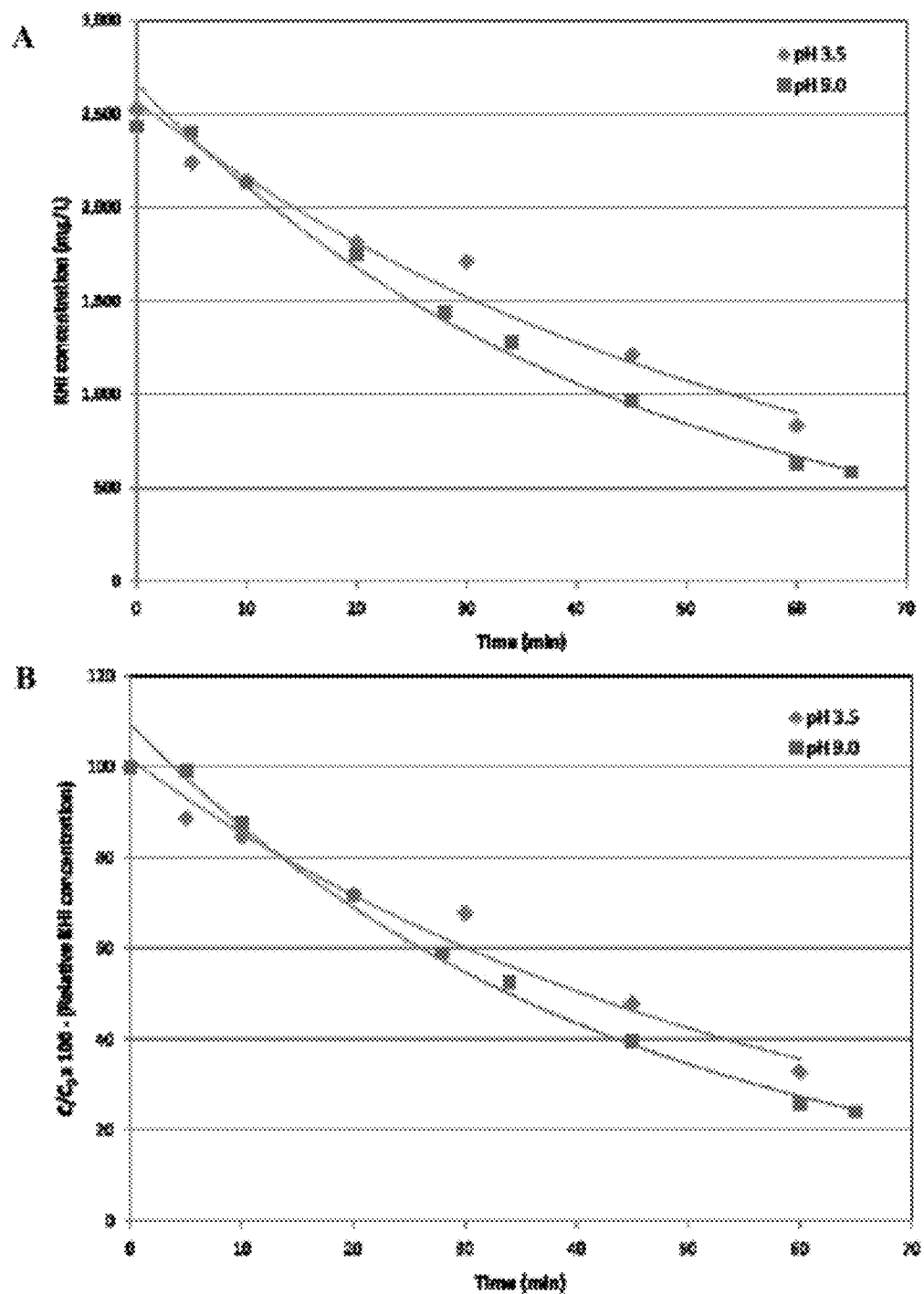
FIG. 6: KHI Oxidation at pH 3.5 and pH 9.0.

Ozonation can remove up to 94% of the KHI present in wastewater (FIG. 5). In one embodiment KHI was removed from a mixed brine solution containing 1.5% KHI by bubbling ozone through the solution. A synthetic brine solution was made with 1.5% KHI, a hyper branched polymer with ethoxy functional group The solution contained 2.2715 g NaCl, 7.3128 g $CaCl_2.2H_2O$, 4.1762 g $MgCl_2.6H_2O$, 26.0295 g of 0.1M KCl, 0.1493 $NaSO_4$, 0.1800 g $NH_4Cl$; 0.1591 g $SrCl_2.6H_2O$, 1.6081 g $NaC_2H_3O_2$, and 30.0117 g of hyper branched KHI, pH was adjusted to 8.83 in 2 L aqueous solution. This synthetic brine is similar to brine separated from sludge catcher of crude oil/LNG production at several facilities.

Ozonation was first run through the synthetic brine without KHI as previously described. 1 liter of water with oxygen flow at 0.4 lt/min was run through an ozone bubbling column (see FIG. 1) with DI water. Inlet ozone was approximately 194.9 $gN/m^3$ to 195.1 $g/Nm^3$ and the outlet ozone concentration was monitored with time to reach steady state value. The residual ozone concentration in water changes with temperature. It was found around 20 ppm Next, ozone was bubbled through synthetic brine with 1.5% KHI at 0.07 lt/min. Inlet ozone concentration was approximately 183.4 $gN/m^3$ and outlet ozone concentration varied time. The experiment was carried for more than 4 hours until a steady state outlet concentration was achieved. Initial and final KHI concentration were around 16,000 mg/l and 285 mg/l, which reflected 96-98% removal.

Field brine was obtained from a crude oil production. The brine was spiked with KHI to a final concentration of 1.5% KHI. The brine pH with KHI addition was about pH 4.1. 250 ml of KHI spiked brine was bubbled for 3.5 hours with 0.07 Nlt/min oxygen, inlet ozone concentration and ozone mass flow rate were 180 $g/Nm^3$ and 0.73 g/h respectively. Samples were taken at 15, 30, 45, 60, 90, 120, 150, 180 and 210 minutes (see FIGS. 2A and B). KHI concentration decreased from 16,787 mg/l initially to 3564 mg/L after ozone treatment. The solution pH decreased from pH 4.1 to 2.2. This demonstrates that ozonation can remove 78% of the KHI from field brine.

This batch system of degrading KHI in a concentrated brine solution demonstrates that ozone can sufficiently degrade KHI and the treated brine may then be re-injected into the well or be used in other applications.

In another embodiment, a solution of 1.5% KHI in OPCO Brine at a pH of 3.6 was bubbled with ozone for 4 hours. Over 80% of the KHI in solution was degraded and cloud point was reduced dramatically. A total volume of 250 ml of 1.5% KHI was bubbled with ozone at 0.07 Nlt/min. The average inlet ozone concentration after 12 minutes was 180 g/Nm3 (gas phase). The system at this scale was exposed to an ozone dosage of 0.73 g/h. 3 ml samples were taken at 15, 30 and 45 minutes after the start up of the experiment and 10 ml samples were taken at 60, 90, 120, 150, 180, 210 and 240 minutes for cloud point analysis. After 240 minutes, the solution was purged with oxygen to remove the remaining ozone gas.

TABLE 3

Ozonation of 1.5% KHI in OPCO brine.

| Sample | Cloud Point Temp (° C.) | KHI Conc. (mg/ml) | KHI Oxidized (%) |
|---|---|---|---|
| Initial | 37 | 14943 | |
| Final | 64 | 2532 | 83% |

Figure 3:
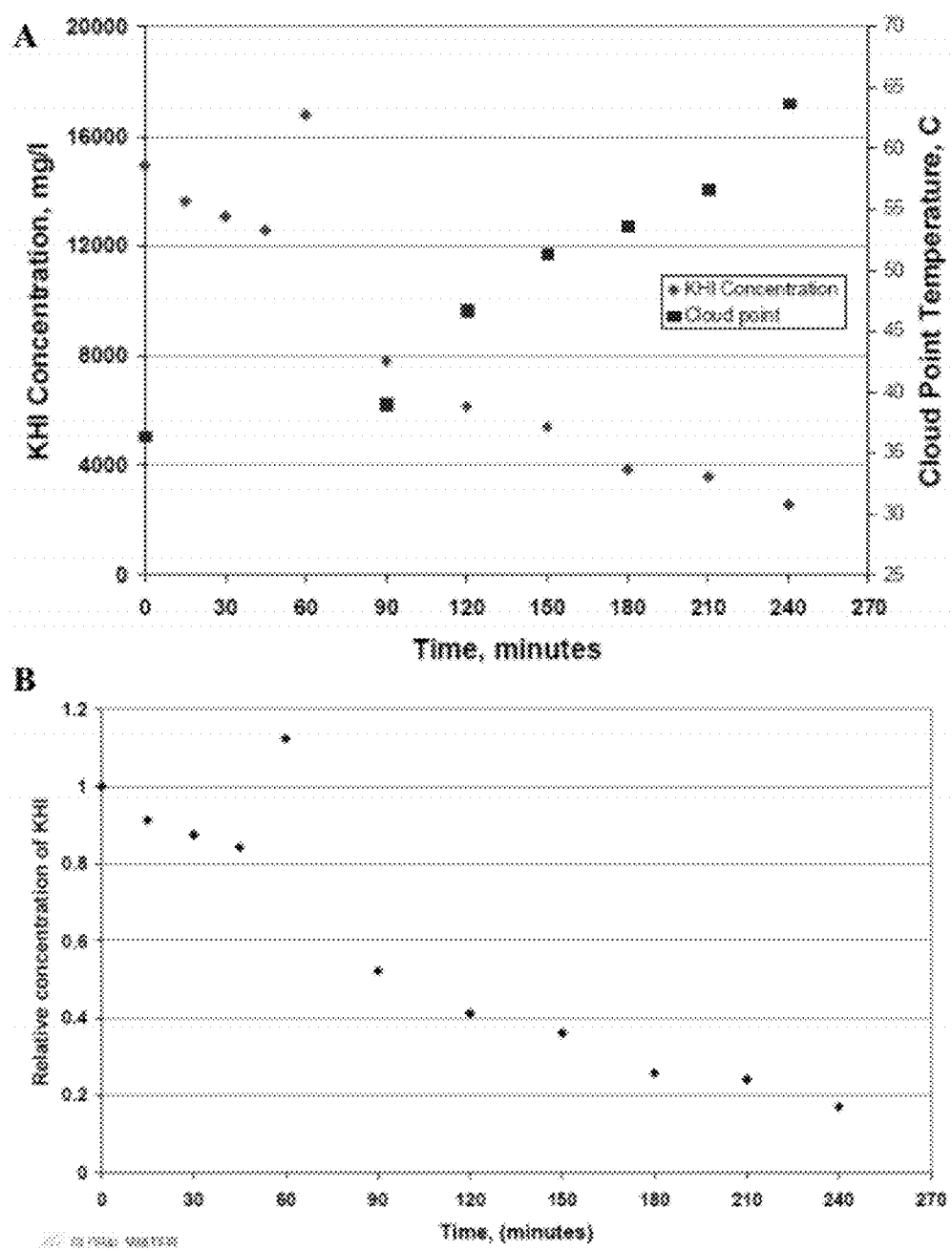
FIG. 3: Oxidation and Cloud Point of 1.5% KHI solutions in synthetic brine. (1.5%) FIG. 3A demonstrate KHI oxidation and cloud point as function of time.

As shown in Table 3 and FIGS. 3A & B, ozonation degraded 1.5% KHI reducing KHI concentration by up to 83% and increasing cloud point temperature to approximately 65° C. Feed and treated samples were centrifuged at 2000 rpm for 30 minutes; the supernatant was filtered through a 0.45 μm filter, and cloud point of the supernatant measured (note that any initial haziness was removed by centrifugation). The supernatant solution was heated up to 64° C., haziness was observed, the solution never became opaque, even at temperatures above 75° C. KHI solutions with higher cloud points dramatically reduces pore plugging in deep reservoir as well as prevent scaling and fouling of equipment used for additional processing.

Example 2 pH Effects

Synthetic brine was mixed with KHI to produce an initial solution with 0.25% KHI (mixed for at least one hour). The pH in two separate brine solutions was adjusted to pH 3.5 and pH 9.0.

Ozone was bubbled for one hour with the following parameters: 250 ml of synthetic brine with 0.25% KHI, mixed for greater than one hour, was treated by ozonation with an oxygen flow rate of 0.075 Nit/min, 4.5 PSI, generating 180 gN/m³ ozone at the inlet with ozone mass flow rate of 0.78 g/h ozonation. Samples (4 ml) were taken at 5, 10, 20, 30, 45 and 60 minutes. After 60 minutes, the solution was purged with oxygen to remove the remaining ozone gas.

synthetic brine with 0.25% KHI at pH 3.5 had 2524 mg/L KHI and an initial cloud point of 42° C. and was completely opaque at 53° C. OPCO Brine with 0.25% KHI at pH 9.0 had 2431 mg/L KHI and an initial cloud point of 42° C. and was completely opaque at 53° C. After bubbling in ozone for 60 minutes, the solutions had dramatic reductions in the total KHI concentration. The pH 3.5 solution had a final KHI concentration of 782 mg/L KHI, an approximately 69% drop in KHI concentration. The pH 9.0 solutions had a final KHI concentration of 517 mg/L KHI, an approximately 79% drop in KHI concentration. The ozonated KHI solutions, both pH 3.5 and pH 9.0, were heated over 80° C., but did not cloud significantly. The solutions were never opaque.

Example 3

Fenton Process

Figure 4:
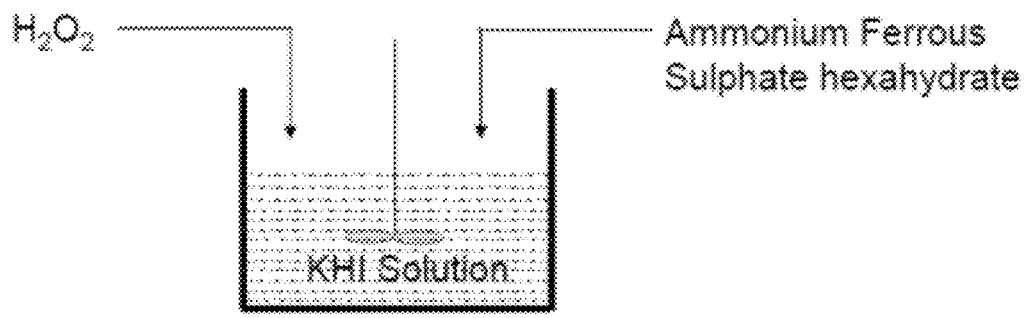
FIG. 4: Fenton's Process.

The Fenton process was conducted by mixing hydrogen peroxide ($H_2O_2$) with the KHI solution and adding ammonium ferrous sulfate hexahydrate ($NH_4FeSO_4 \cdot 6H_2O$). Mixing the $H_2O_2$ with $NH_4FeSO_4 \cdot 6H_2O$ releases oxygen radicals producing hydroxyl ions and hydroxyl radicals, that may then react with reactive groups in the KHI (FIG. 4). In one embodiment, a 0.25% KHI brine solution was treated using the Fenton Process to remove KHI. In a 500 ml volumetric flask, 100 ml concentrated 5 fold concentrated synthetic brine was mixed with 100 ml of 12.5 mg/ml KHI for 1 hour. Next, 157 ml of 6% H2O2 was added along with 100 ml 66.3 mg/ml $NH_4FeSO_4 \cdot 6H_2O$. The flask was filled to 500 ml with deionized water for a final volume of 500 ml. After stirring, the solution was allowed to settle. The solution color goes from transparent to light orange to opaque dark orange. After several hours, the iron oxides precipitated to the bottom of the flask and the solution returned to a transparent light orange color. The clarified solution had a KHI concentration of 401 mg/L. This process resulted in approximately 84% KHI removal.

Example 4

Fenton Process and Ozonation

Figure 7:
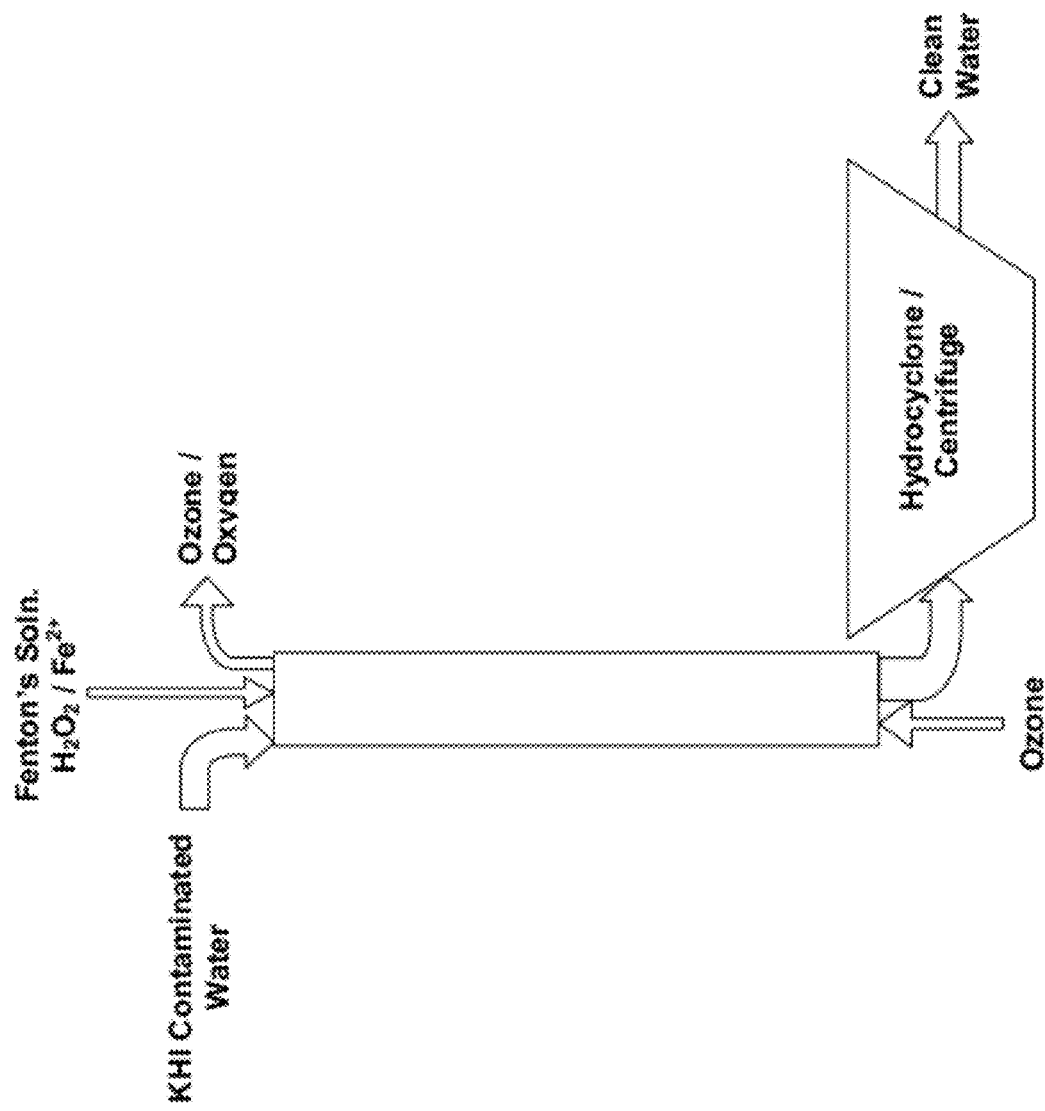
FIG. 7: Simultaneous ozonation and Fenton process treatment.

Several individual processes were shown to remove a majority of the KHI from a simulated wastewater stream. Individually, ozonation or the Fenton process could remove up to 95% of the KHI from a 0.25% KHI Brine solution. This is sufficient in most cases to either re-inject the water solution or use the water for other processes. If the water must be further processed or if the KHI concentrations are higher due to extreme conditions, the processes may be used simultaneously or sequentially to achieve degradation of more KHI. Additionally, a method is developed to incorporate KHI removal in a continuous process. In FIG. 7, KHI is treated with ozonation and the Fenton process simultaneously. A wastewater stream containing KHI is mixed with concentrated $H_2O_2$ and fed into a column (either vertical or horizontal), an iron ($Fe^{2-}$) containing solution is added either at the top of the column or at intervals along the column then ozone may be added either at the top of the column or along the length of the column, clean water is centrifuged, filtered or otherwise separated from the iron precipitate, to generate purified water for re-injection or other use. If the column is vertical, KHI containing wastewater mixed with concentrated peroxide may be fed into the top of the column with an iron ($Fe^{2+}$) containing solution and ozone bubbled from the bottom of the column. After the process is complete, the waste is centrifuged to remove precipitates.

Figure 8:
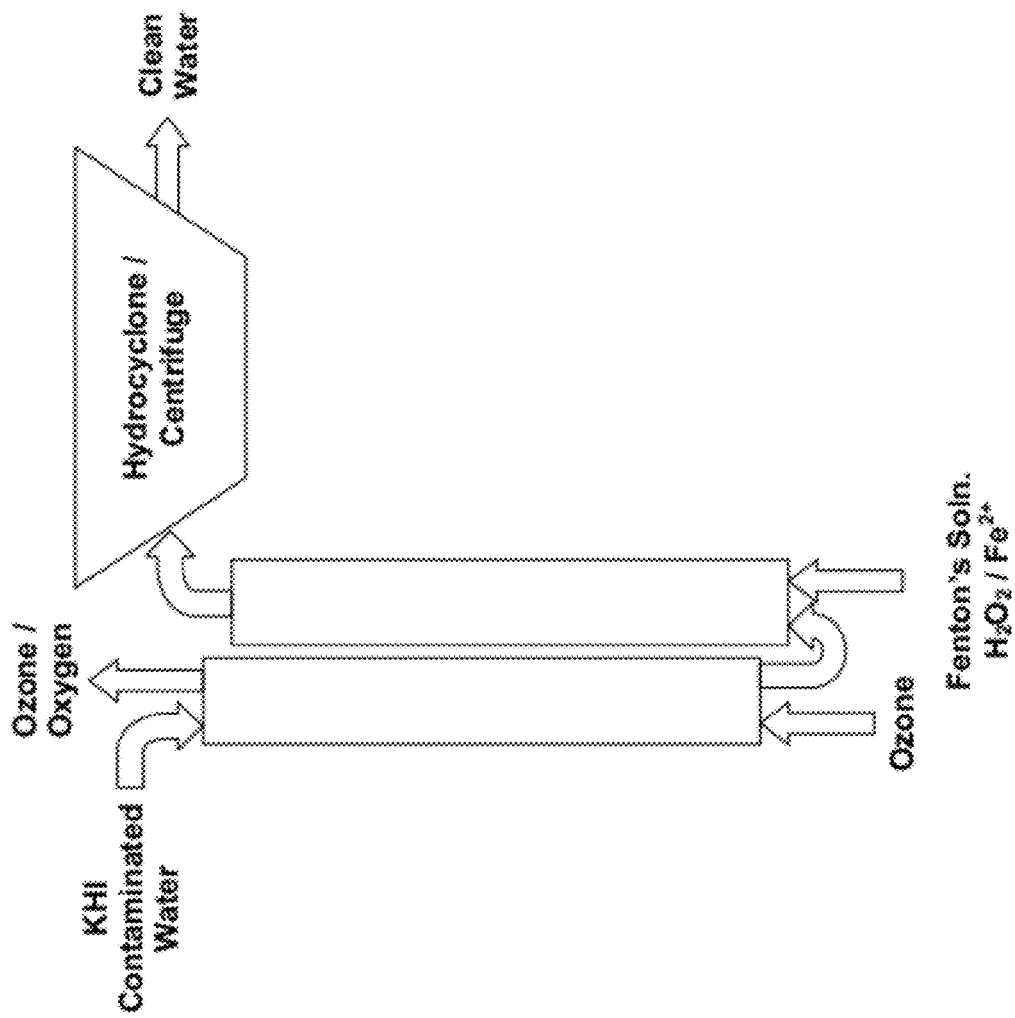
FIG. 8: Sequential ozonation then Fenton process treatment.

The processes may also be run in series where the KHI contaminated brine is treated with ozonation then the Fenton Process. The process may be conducted vertically with the ozone and brine fed at one end of the column and gases removed from the other. Alternatively, as shown in FIG. 8, the KHI contaminated water is fed into the top of a bubble column and ozone is fed from the bottom. As the KHI contaminated water flows down the column, the ozone concentration will increase and the KHI concentration decrease, thus producing treated water at the end of the column. Column flow rate is dictated by the initial concentration of KHI, rate of ozone production, length of the bubble column, and final concentration of KHI desired. In one embodiment, the water from the treated column may then mixed with peroxide and fed with iron (Fe2+) into an adjacent column. After sufficient reaction time, the clean water is centrifuged or filtered to remove particulates and the clean water is produced.

Figure 9:
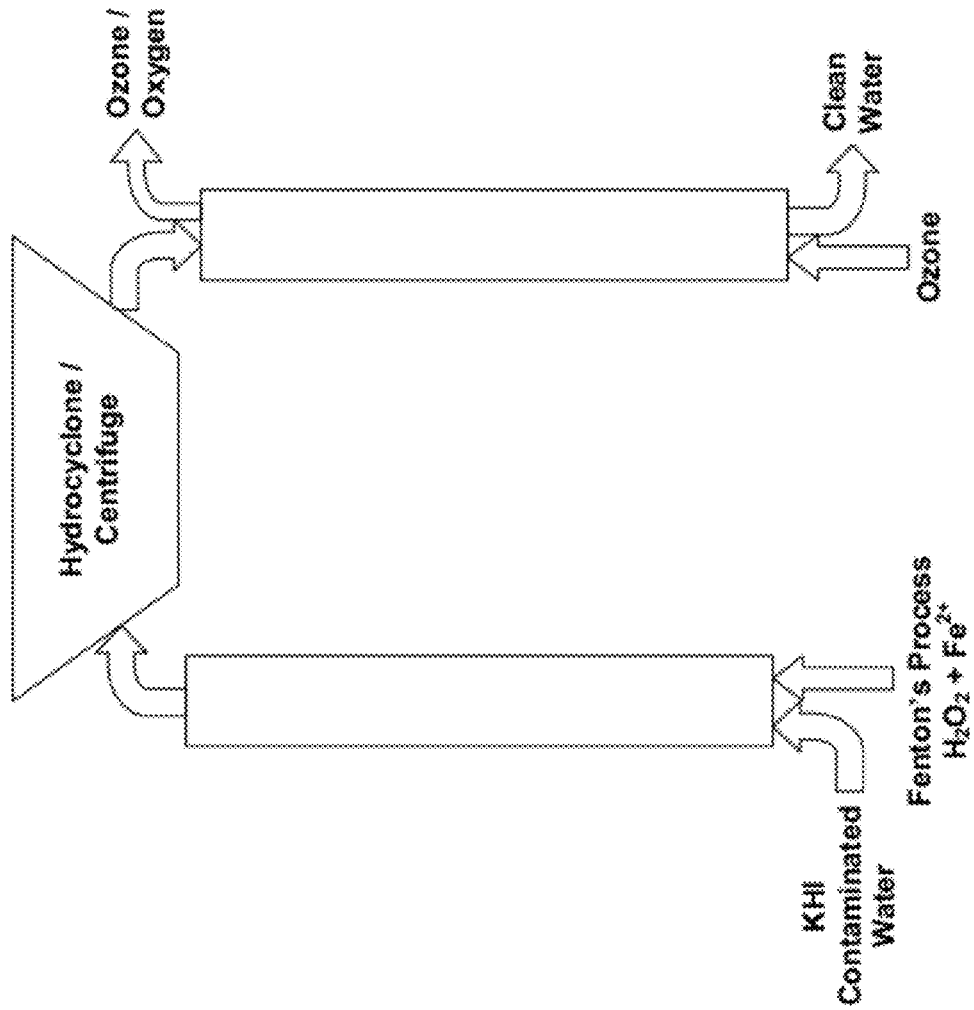
FIG. 9: Sequential Fenton process treatment then ozonation.

The process may also be run where the KHI contaminated brine is treated by the Fenton process then ozonation. A sequential process is shown in FIG. 9, with Fenton Process and then Ozonation occurring in adjacent columns. Centrifugation may be done after a Fenton process or after ozonation, dependent upon reactor design and the amount of precipitate produced during the Fenton process. Although "columns" are used to demonstrate the process these columns may be any diffuser, mixer or contact system including baffle diffusers, turbine diffusers, a side stream contactor with Fenton's reagents, ozonation, wet oxidation or other AOP fed at the beginning of the diffuser/mixer or along the length of the diffuser/mixer. Alternatively, Fenton's process and ozonation may be carried out in one or more columns, diffusers, tanks, batch fed tanks, including sedimentation tanks or ponds, to achieve a similar level of water treatment.

In one embodiment Fenton's process is conducted in a sedimentation tank containing KHI contaminated brine. A peroxide solution is added to achieve approximately 7.5:1 molar ratio of peroxide to KHI. After stirring or mixing to achieve a uniform distribution an iron ($Fe^{2+}$) solution is added to achieve a 1:10 ratio for iron to peroxide. The solution is again mixed to achieve a uniform distribution. The solution is allowed to settle before ozone is bubbled in the tank. Once sufficient KHI has been degraded the clean water is removed and the process is repeated. When excess precipitate builds up, the precipitate can be removed and either recycled, sold as raw ferric oxide, or otherwise disposed of. The process may be done at atmospheric pressure and ambient temperature, or the container may be closed and pressurized to prevent bubbling during ozonation. Additionally, an anti-foaming agent may be added to reduce or prevent foaming.

Experimental results have proven large amount of KHI can be degraded using either an ozonation or Fenton process. Cloud point determination demonstrated that clean water is produced that can be either re-injected or used for other processes. This technology can be used to clean large quantities of produced water from a variety of processes where KHI can be used to prevent or slow hydrate formation. This is essential as production and transportation of crude oil, bitumen, tar sands, LNG, and other petrochemicals move to more difficult environments that increase the chance of hydrate formation, hydrate inhibitors will be used more frequently at higher concentrations. KHI inhibitors become more viable and less problematic now that this disposal system, using ozonation, Fenton's process, or combinations to remove KHI. Preventing hydrates is essential to prevent clogging with hydrates and to prevent dangerous gas pressure fluctuations caused by rapid hydrate dissociation.

Example 5

Pilot Scale and Full Scale Production Process

In another embodiment, the process may be used to process produced water from a subterranean formation. Rates and conditions vary from formation to formation and the oxidation process may be scaled to a variety of production rates as shown in Table 4.

TABLE 4

Production flow rate and ozone requirement.

| | Flow Rate (m³/hr) | | | | | | |
|---|---|---|---|---|---|---|---|
| | 5 | 10 | 20 | 30 | 50 | 75 | 100 |
| KHI (kg/d) | 1800 | 3600 | 7200 | 10800 | 18000 | 27000 | 36000 |
| Ozone use (kg/d) | 1025 | 2049 | 4099 | 6148 | 10247 | 15370 | 20493 |

Although scaling may be accomplished by simply increasing contact time with additional ozone, other methods of increasing contact time include increasing the size and length of the diffuser, increasing the number of diffusers, and adding one or more additional oxidizing agents. In one embodiment $ClO_2$ is added prior to ozonation in a diffuser or column.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication date after the priority date of this application. Incorporated references are listed again here for convenience:

1. U.S. Pat. No. 6,646,082, US2003065116, "Rohm & Haas (Ghosh) Priority: Sep. 4, 2001.
2. U.S. Pat. No. 7,435,845, US2005101495, "Corrosion and gas hydrate inhibitors having improved water solubility and increased biodegradability" Clariant (Dahlman) Priority: Feb. 24, 2003.
3. U.S. Pat. No. 7,615,102, US20090173663, WO2006040013, Clariant (Leinweber), Priority: Oct. 7, 2004.
4. US2003063998, Rohm & Haas (Ghosh), Priority: Sep. 4, 2001
5. US20080312478, WO2006110192, Exxonmobil Upstream Research Co. (Talley), Priority: Apr. 7, 2005.
6. US 20090173663 "Corrosion and gas hydrate inhibitors with an increased biological degradability and a reduced toxicity" (2009).
7. "Peroxone (Ozone/Hydrogen Peroxide)," EPA Guidance Manual Alternative Disinfectants and Oxidants (1999).
8. Agladze, et al., "Comparative study of hydrogen peroxide electro-generation on gas-diffusion electrodes in undivided and membrane cells." J. Appl. Ellectrochem. 37:375-83 (2007).
9. Benner and Terner, "Ozonation of Propranolol: Formation of Oxidation products," Environmental Science Technology 43:5086-93 (2009).
10. Brillas, et al., "Electro-Fenton Process and Related Electrochemical Technologies Based on Fenton's Reaction Chemistry." Chem. Rev. 109:6570-631 (2009).
11. Da Pozzo, et al., "Oxidation efficiency in the electro-Fenton process." J. Appl. Electrochem. 35:391-8 (2005).
12. Delanghe, et al., "Aqueous Ozonation of Surfactants: A Review." Ozone Sci. Eng. 13:639-73 (1991).

13. Homg, et al., "Enhanced electrochemical oxidation of anionic surfactants." J. Environ. Sci. Health, part A 33:681-99 (1998).
14. Huber, et al., "Oxydation of pharmaceuticals during ozonation of municipal waste water effluents: A pilot study," Environmental Science Technology 39:4290-9 (2005).
15. Klasson, et al., "Ozone treatment of soluble organics in produced water, Petroleum Environment," Research Forum Project 98-04, Oak Ridge National Laboratory, (2002).
16. Loraine, "Oxidation of polyvinylpyrrolidone and an ethoxylate surfactant in phase inversion waste water," Water Environment Research, 4: 373-9 (2008).
17. Masten and Davies, "The use of ozonation to degrade organic contaminants in waste waters," Environmental Science Technology 28:180A-185A (1994).
18. Narkis and Schneider-Rotel, "Ozone-Induced Biodegradability of a Non-ionic Surfactant." Water Res. 14:1225-32 (1980).
19. Narkis and Schneider-Rotel, "Ozonation of Non-ionic Surfactants in Aqueous Solutions." Water Sci. Tech. 17:1069-80 (1985).
20. Narkis, et al., "Non-Ionic Surfactants Interactions with Ozone." Tenside Sufactants Detergents 24:200-6 (1987).
21. Oturan and Brillas, "Advanced Oxidation Processes for Wastewater Treatment: 2. Wastewater Treatment by Electro-Fenton Process." J. Environ. Eng. Manage., 19:233-4 (2009).
22. Oturan, et al., "Degradation Of Pesticides In Aqueous Medium By Electro-Fenton And Related Methods. A Review." J. Environ. Eng. Manage., 19 (5), 235-55 (2009).
23. Peralta-Hernández, et al., "Recent Advances in the Application of Electro-Fenton and Photoelectro-Fenton Process for Removal of Synthetic Dyes in Wastewater Treatment," J. Environ. Eng. Manage., 19:257-65 (2009).
24. Petrucci, et al., "Effect of Carbon Material on the Performance of a Gas Diffusion Electrode in Electro-Fenton Process," J. Environ. Eng. Manage., 19:299-305 (2009).
25. Rosales, et al., "Influence of operational parameters on electro-Fenton degradation of organic pollutants from soil." J. Env. Sci. Health Part A, 44:1104-10 (2009).
26. Shanbag, et al., "Membrane based ozonation of organic compounds," Ind. Eng. Chem. Res. 37:4388-4398 (1998).
27. Stemmler and Gonten, "OH radical initiated oxidation of organic compounds in atmospheric water phases: part 1. Reaction of peroxyl radicals derived from 2-butoxyethanol in water, Atmospheric Environment 34:4241-52 (2000).
28. Stemmler and Gonten, "OH radical initiated oxidation of organic compounds in atmospheric water phases: part 2. Reaction of peroxy radicals derived with transition metals," Atmospheric Environment 34:4253-64 (2000).
29. Suzuki, "Study on Ozone Treatment of Water-Soluble Polymers. I. Ozone Degredation of Polyethylene Glycol in Water." J. Appl. Polymer Sci. 20:2791-7 (1976).
30. Suzuki, et al., "Study on Ozone Treatment of Water-Soluble Polymers. II. Utilization of Ozonized Polyethylene Glycol by Bacteria." J. Appl. Polymer Sci. 20:2791-7 (1976).
31. Urbans, "Practical Application of Peroxide for Iron & Hydrogen Sulfide." Res-Kem Corp., Media, Pa. 1-5 (2006).
32. Villano, et al., Class of Kinetic hydrate inhibitor with good biodegradability, Energy & Fuels, 22:3143-9 (2008).
33. Villano, et al., A study of the Kinetic Hydrate Inhibition performance and sea water biodegradability of a series of Poly(2-alkyl-2-oxazoline)s, Energy & Fuels, 23:3665-73 (2009).

The invention claimed is:

1. A process for treating kinetic hydrate inhibitor (KHI) containing aqueous solutions comprising:
   a) mixing one or more said kinetic hydrate inhibitor (KHI) containing aqueous solutions with a KHI degrading oxygen containing molecule to obtain a KHI degraded solution containing precipitates, wherein the KHI degrading oxygen containing molecule is provided by the step of
      (i) adding hydrogen peroxide then adding iron in a 2+ oxidation state (Fenton's Process);
      (ii) bubbling with ozone (ozonation); or
      (iii) both (i) and (ii);
   b) separating the precipitates from the KHI degraded solution; and
   c) obtaining clean water;
   wherein the KHI is a branched methoxylate, ethoxylate, propoxylate, butoxylate, pentoxylate, hexoxylate, carboxylate, ester, or other oxygenated KHI.

2. The process of claim 1, wherein said process is conducted in a tank, sediment pond, or other water storage container.

3. The process of claim 1, wherein said process comprises one or more columns in a continuous process.

4. The process of claim 1, wherein said process comprises ozonation and Fenton's Process simultaneously.

5. The process of claim 1, wherein said process comprises ozonation followed by Fenton's Process.

6. The process of claim 1, wherein said process comprises Fenton's Process followed by ozonation.

7. The process of claim 1, wherein one or more KHIs are selected from the group consisting of vinyl caprolactam, ester amides, polyester pyroglutamate, N-acylalkylene imines, 2-alkyl-2-oxazolines, PMeOx, PEtOx, PnPrOx, PiBuOx, PnBuOx, N-vinyl-N-methyl acetamide, vinylpyrrolidone, PVP, tetrabutylammonium bromide, PDMAEMA, homopolymers, copolymers, linear, branched monomers, polymers and mixed polymers thereof.

8. A process for treating kinetic hydrate inhibitor (KHI) containing aqueous solutions to obtain a KHI degraded solution containing precipitates, the process comprising:
   a) adding hydrogen peroxide then adding iron in a 2+ oxidation state (Fenton's Process) to one or more KHI containing aqueous solutions;
   b) separating the precipitates from the KHI degraded solution; and
   c) obtaining clean water;
   wherein the KHI is a branched methoxylate, ethoxylate, propoxylate, butoxylate, pentoxylate, hexoxylate, carboxylate, ester, or other oxygenated KHI.

9. The process of claim 8, wherein said process is conducted in a tank, sediment pond, or other water storage container.

10. The process of claim 8, wherein said process comprises one or more columns in a continuous process.

11. The process of claim 8, wherein said process comprises bubbling with ozone (ozonation) and Fenton's Process simultaneously.

12. The process of claim 8, wherein said process comprises ozonation followed by Fenton's Process.

13. The process of claim 8, wherein said process comprises Fenton's Process followed by ozonation.

14. The process of claim 8, wherein one or more KHIs are selected from the group consisting of vinyl caprolactam, ester amides, polyester pyroglutamate, N-acylalkylene imines, 2-alkyl-2-oxazolines, PMeOx, PEtOx, PnPrOx, PiBuOx, PnBuOx, N-vinyl-N-methyl acetamide, vinylpyrrolidone, PVP, tetrabutylammonium bromide, PDMAEMA, homopolymers, copolymers, linear, branched monomers, polymers and mixed polymers thereof.

15. A process for treating kinetic hydrate inhibitor (KHI) containing aqueous solutions to obtain a KHI degraded solution containing precipitates, the process comprising:
   a) bubbling one or more KHI containing aqueous solutions with ozone (ozonation);
   b) separating the precipitates from the KHI degraded solution; and
   c) obtaining clean water;
wherein the KHI is a branched methoxylate, ethoxylate, propoxylate, butoxylate, pentoxylate, hexoxylate, carboxylate, ester, or other oxygenated KHI.

16. The process of claim 15, wherein said process is conducted in a tank, sediment pond, or other water storage container.

17. The process of claim 15, wherein said process comprises one or more columns in a continuous process.

18. The process of claim 15, wherein said process comprises ozonation and adding hydrogen peroxide then adding iron in a 2+ oxidation state (Fenton's Process) simultaneously.

19. The process of claim 15, wherein said process comprises ozonation followed by adding hydrogen peroxide then adding iron in a 2+ oxidation state (Fenton's Process).

20. The process of claim 15, wherein said process comprises adding hydrogen peroxide then adding iron in a 2+ oxidation state (Fenton's Process) followed by ozonation.

21. The process of claim 15, wherein one or more KHIs are selected from the group consisting of vinyl caprolactam, ester amides, polyester pyroglutamate, N-acylalkylene imines, 2-alkyl-2-oxazolines, PMeOx, PEtOx, PnPrOx, PiBuOx, PnBuOx, N-vinyl-N-methyl acetamide, vinylpyrrolidone, PVP, tetrabutylammonium bromide, PDMAEMA, homopolymers, copolymers, linear, branched monomers, polymers and mixed polymers thereof.

* * * * *